(12) United States Patent
Wheeler et al.

(10) Patent No.: US 10,020,644 B1
(45) Date of Patent: Jul. 10, 2018

(54) MOVABLE RACEWAY

(71) Applicant: FlexAbility Concepts, LLC, Oklahoma City, OK (US)

(72) Inventors: Frank Wheeler, Oklahoma City, OK (US); Robert Widmer, Oklahoma City, OK (US)

(73) Assignee: FlexAbility Concepts, LLC OK (US)

( * ) Notice: Subject to any disclaimer, the term of this patent is extended or adjusted under 35 U.S.C. 154(b) by 0 days.

(21) Appl. No.: 15/191,063

(22) Filed: Jun. 23, 2016

Related U.S. Application Data

(60) Provisional application No. 62/183,614, filed on Jun. 23, 2015.

(51) Int. Cl.
*H02G 3/04* (2006.01)

(52) U.S. Cl.
CPC ......... *H02G 3/0406* (2013.01); *H02G 3/0437* (2013.01); *H02G 3/0487* (2013.01)

(58) Field of Classification Search
CPC .......... H02G 3/0616; H02G 3/00; H02G 3/02; H02G 3/32; H02G 3/30; H02G 3/0406; H02G 3/0437; H02G 3/0487; H02G 3/288; H02G 3/0475; F16L 3/12; F16L 7/00; F16L 3/227; F16L 3/23; F16G 13/16
USPC ....... 174/480, 481, 60, 67, 68.1, 72 A, 68.3, 174/95, 97, 96, 99 R, 135, 72 R; 220/3.2, 220/3.8, 3.5; 385/134, 135; 439/207, 439/209–213; 52/220.1, 220.3, 220.5, 52/220.7, 220.8, 249; 248/68.1, 49, 62, 248/74.2
See application file for complete search history.

(56) References Cited

U.S. PATENT DOCUMENTS

| | | | | |
|---|---|---|---|---|
| 4,277,123 A * | 7/1981 | Haworth | ................ | H02G 3/288 174/495 |
| 4,570,437 A * | 2/1986 | Moritz | ................... | F16G 13/16 248/49 |
| 4,658,577 A * | 4/1987 | Klein | ..................... | F16G 13/16 248/49 |
| 4,918,886 A * | 4/1990 | Benoit | ................... | H02G 3/288 174/496 |
| 5,240,209 A * | 8/1993 | Kutsch | .................... | F16G 13/16 248/49 |
| 6,107,565 A * | 8/2000 | O'Rourke | ............... | F16G 13/16 174/101 |
| 6,459,037 B2 * | 10/2002 | Muller | .................... | F16G 13/16 174/68.1 |
| 7,576,283 B2 * | 8/2009 | Kadrnoska | ........... | H02G 3/0475 174/70 C |
| 7,617,669 B1 * | 11/2009 | Komiya | .................. | F16G 13/16 248/49 |

(Continued)

*Primary Examiner* — Angel R Estrada
(74) *Attorney, Agent, or Firm* — Hall Estill Attorneys at Law

(57) ABSTRACT

Apparatus and corresponding method contemplating electrical raceway technology. A first segment has opposing first sidewalls and a first partition between the first sidewalls. A second segment has opposing second sidewalls and a second partition between the second sidewalls. The second segment is operably connected to the first segment so that the segments are selectively movable in relation to each other. The first sidewalls overlap the respective second sidewalls, and the partitions overlap at all selected movable positions of the segments, to define separate compartments in the raceway.

1 Claim, 21 Drawing Sheets

(56) References Cited

U.S. PATENT DOCUMENTS 7,718,894 B2 * 5/2010 Blase .................. F16G 13/16
174/481

* cited by examiner

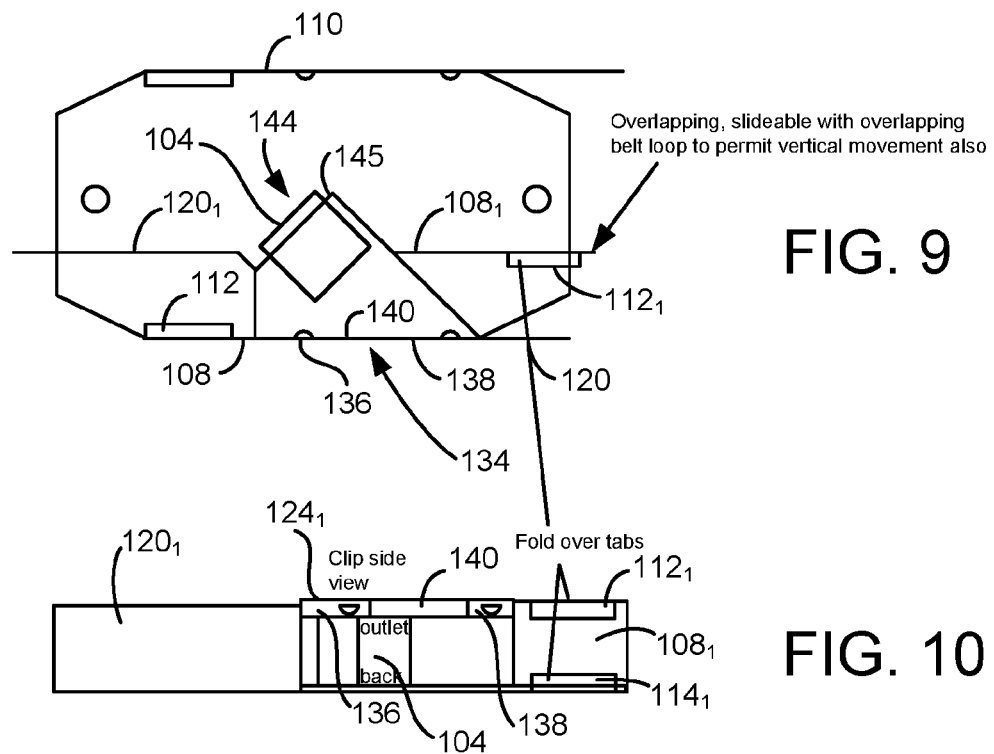
FIG. 9
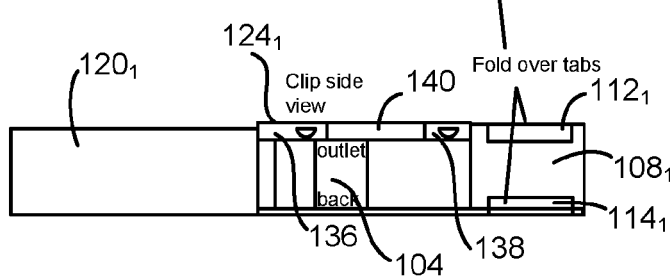
FIG. 10
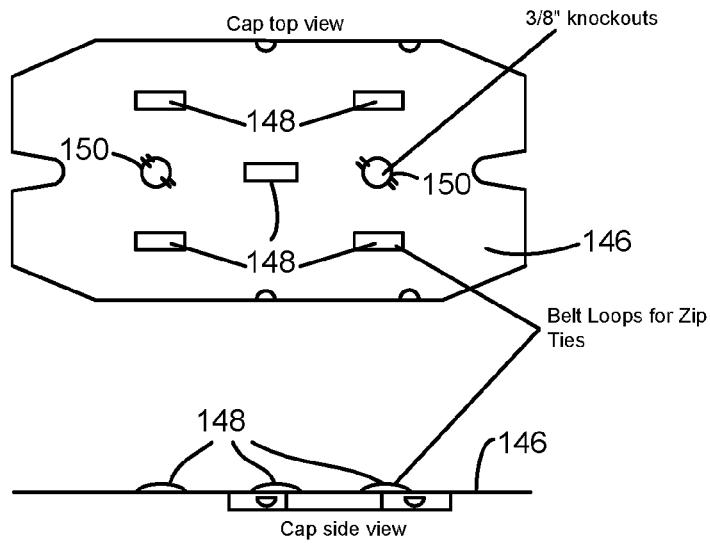
FIG. 12
FIG. 13

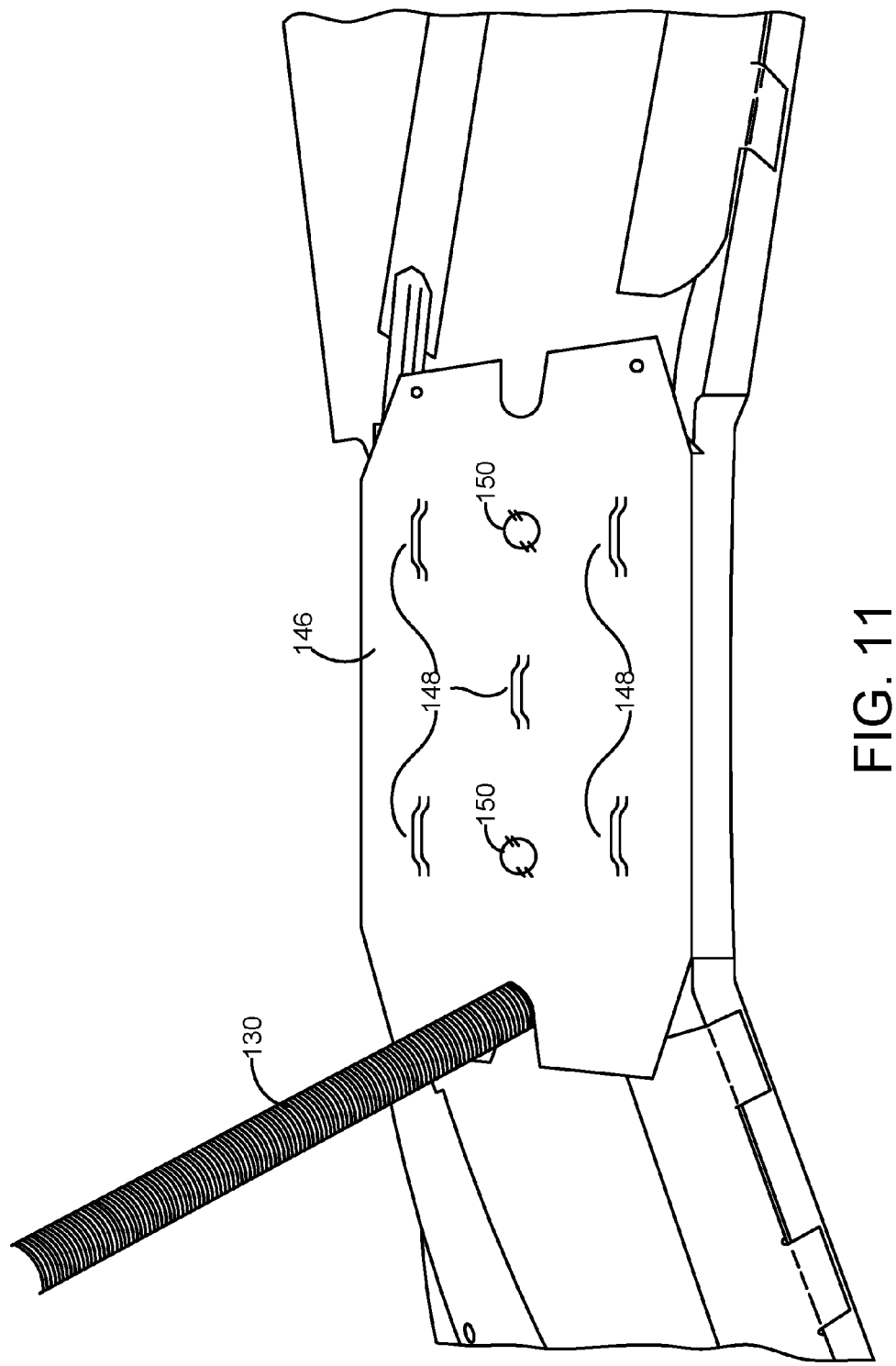

MOVABLE RACEWAY

RELATED APPLICATIONS

The present application claims the benefit of the earlier filing date of U.S. provisional patent application Ser. No. 62/183,614 filed on Jun. 23, 2015.

BACKGROUND

Diverse construction assemblies are used in new and existing buildings to make the construction process more efficient. For example, components and assemblies are brought together for framing a wall, and then different types of components and assemblies are brought together to build systems into the wall such as plumbing and electrical systems. Typically, a general contractor manages delivery of the particular components and assemblies and then assigns the appropriate team of laborers to construct that portion of the building.

One known way of simplifying the electrical distribution system in a building is by using electrical raceways into which electrical wiring, conduit, and assorted connectors are placed to support and direct the location of terminal ends to a power supply or an electrical fixture. The raceways can advantageously be prewired to reduce the amount of construction needed by the on-site laborers. Often it is necessary to segregate different classes of electrical wiring, such as separating high voltage from low voltage (or control voltage) wiring. In previously attempted solutions it becomes cumbersome to provide all these features without necessarily constructing the raceways by joining straight sections together.

What is needed are improvements in electrical raceway technology that make on-site construction more efficient and performed by laborers of relatively lower skills than a journeyman electrician. It is to these improvements that embodiments of the present technology are directed.

SUMMARY

Embodiments of this technology contemplate a raceway including a first segment having opposing first sidewalls and a first partition between the first sidewalls. A second segment has opposing second sidewalls and a second partition between the second sidewalls. The second segment is operably connected to the first segment so that the segments are selectively movable in relation to each other. The first sidewalls overlap the respective second sidewalls, and the partitions overlap at all selected movable positions of the segments, to define separate compartments in the raceway.

BRIEF DESCRIPTION OF THE DRAWINGS

Details of various embodiments of the present technology are described in connection with the accompanying drawings that bear similar reference numerals.

FIG. 9 is a top depiction of a segment assembly in the movable raceway of FIG. 5, but with a complete internal partition.

FIG. 10 is an elevational depiction of the inner partition in the segment assembly of FIG. 9.

FIG. 11 is a top depiction of a cap attached to the top of the movable raceway of FIG. 5.

FIG. 12 is a top depiction of the cap of FIG. 11.

FIG. 13 is a side depiction of the cap of FIG. 11.

DESCRIPTION

Initially, this disclosure is by way of example only, not by limitation. The illustrative constructions and associated methods disclosed herein are not limited to use or application for routing electrical power to any specific system or environment. That is, the disclosed technology is not limited to usage for routing electrical wires to a lighting fixture or a ceiling fan and the like as is disclosed in the illustrative embodiments. Thus, although the instrumentalities described herein are for the convenience of explanation, shown and described with respect to exemplary embodiments, the skilled artisan understands that the principles herein may be applied equally in other types of systems and environments involving the routing of electrical power.

Figure 1:
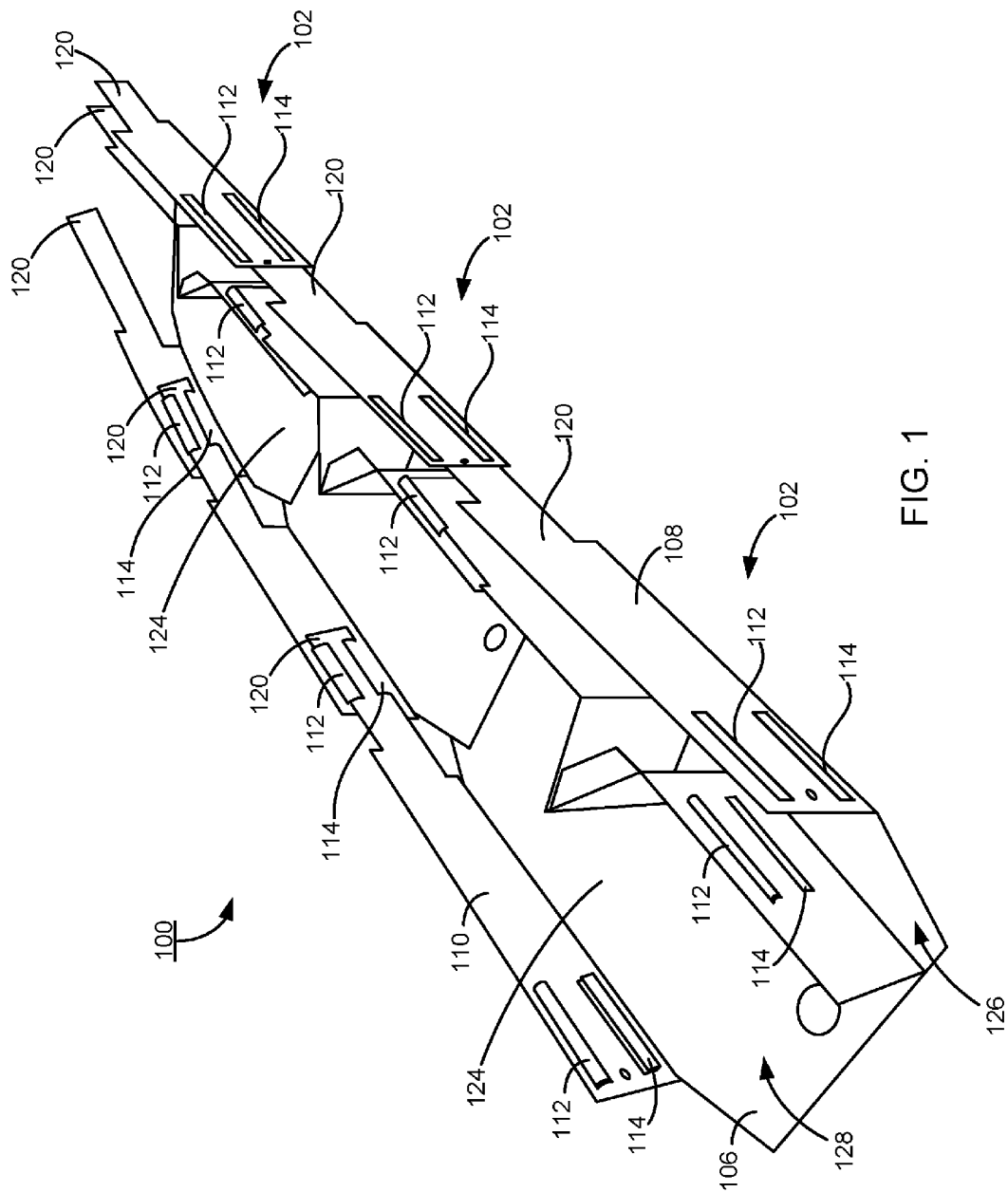
FIG. 1 is an isometric depiction of a portion of a movable raceway that is constructed in accordance with embodiments of this technology.

FIG. 1 depicts a short section of a selectively movable raceway 100 that is constructed in accordance with illustrative embodiments of the present invention. In these illustrative embodiments the movable raceway 100 is depicted in the manner in which it would be suspended by drop rods connected to an overhead structure. The movable raceway 100 is constructed by an end-to-end joinder of a number of segment assemblies 102. In these depicted embodiments for simplicity sake there are three segment assemblies 102 joined together, and the skilled artisan will understand that a movable raceway 100 of a desired length can be constructed by joining more segment assemblies 102. Preferably each of the segment assemblies 102 is constructed of the same manufactured part(s) to simplify the manufacturing complexity by reducing the number of unique parts. Generally, that means the segment assemblies 102 are preferably made by repeatedly using a common structural segment having a first connecting feature on one end that matingly engages a second connecting feature on the other end.

In these depicted embodiments the structural parts are constructed of stamped and formed sheet metal although the contemplated embodiments are not so limited. In alternative embodiments the structural parts can be otherwise constructed such as of molded and/or formed of plastic or composite materials, primary or secondary machined materials, and the like.

In the illustrative embodiments of FIG. 1 each of the segment assemblies 102 includes an electrical receptacle 104. The electrical receptacles 104 are used to supply power to devices such as lighting fixtures, appliances, ceiling fans, and the like. For example, an electrical fixture 106 has a plug 107 that is depicted as being plugged into the middle electrical receptacle 104. Typically, a number of the receptacles 104 can be electrically wired in series to a supply source of power (not depicted). The supply source can be a higher voltage than what is required to operate the fixture 106. The receptacle 104 and/or the plug 107 can include circuitry that reduces (steps down) the high voltage supply power to a low voltage for the fixture. For example, without limitation, in some applications the high voltage wiring can be rated for 600 volts and the stepped-down low voltage rated wiring for the fixture can be rated for 120 volts.

The receptacles 104 wired together gives the user the flexibility to plug the fixture 106 into the nearest available receptacle 104. These illustrative embodiments depicting a receptacle 104 in each segment assembly 102 provides the user with the greatest flexibility for placing the fixture 106 near an available receptacle 104, although the contemplated embodiments are not so limited. In alternative equivalent embodiments one or more of the segment assemblies (not depicted) can omit the receptacle 104 so that there are more segment assemblies 102 than there are receptacles 104. In that case the high voltage electrical wiring can simply bridge segment assemblies 102 lacking a receptacle 104, connecting the adjacent receptacles 104 in series. In alternative equivalent embodiments one or more of the receptacles 104 can be electrically connected together in one circuit and one or more different receptacles 104 can be electrically connected together in one or more additional circuits, in series or in parallel.

Adjacent segment assemblies 102 can be mechanically connected together so that they are selectively movable with respect to each other. For example, adjacent segment assemblies 102 can be connected by a pivotal connector and/or by a longitudinal connector to selectively position them with respect to each other. Each segment assembly 102 has an underlying structural segment supporting the receptacle 104. In these depicted embodiments the segment has a generally planar base 109 with a pair of opposing flanges 108, 110 extending from the base 109.

Figure 2:
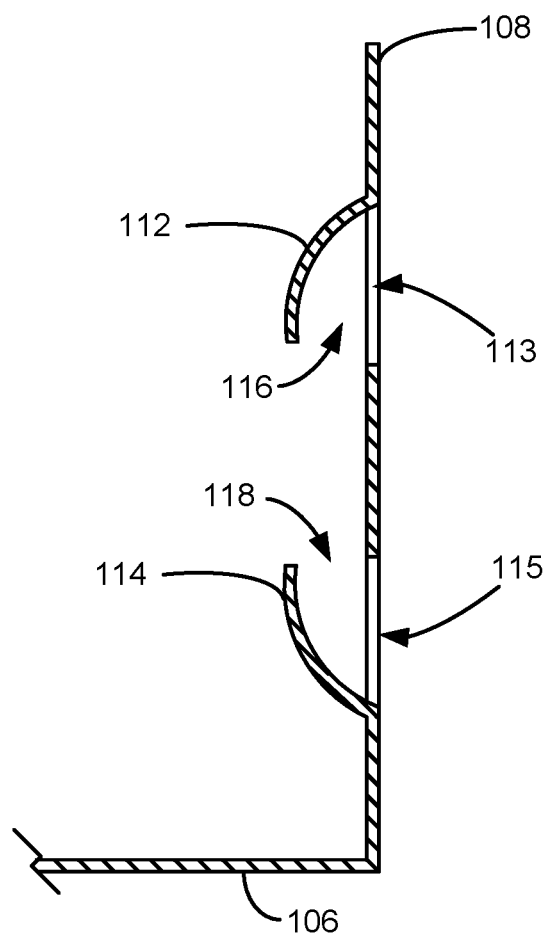
FIG. 2 is a cross sectional depiction of the upstanding flange in a segment of the movable raceway of FIG. 1.
Figure 3:
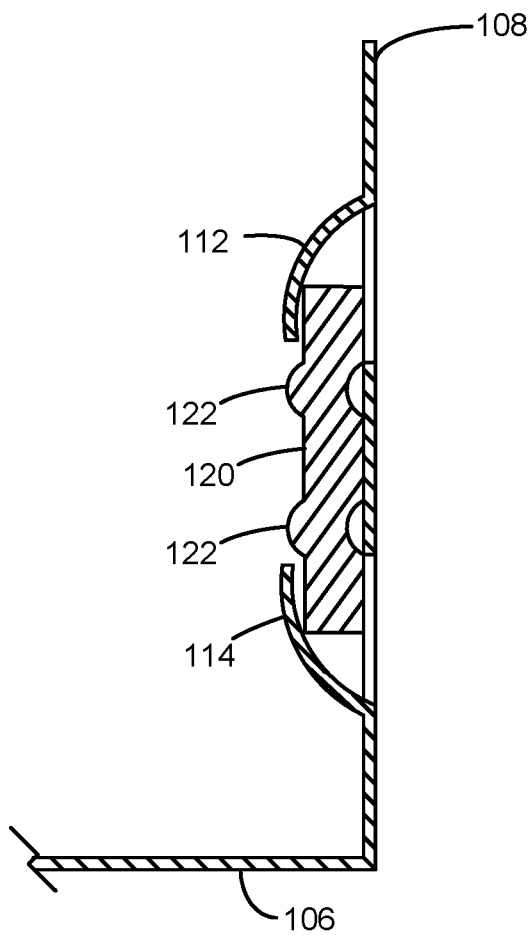
FIG. 3 is similar to FIG. 2 but further depicting the tab of one segment slidingly engaged in channels of the upstanding flange of another connected segment.
Figure 4:
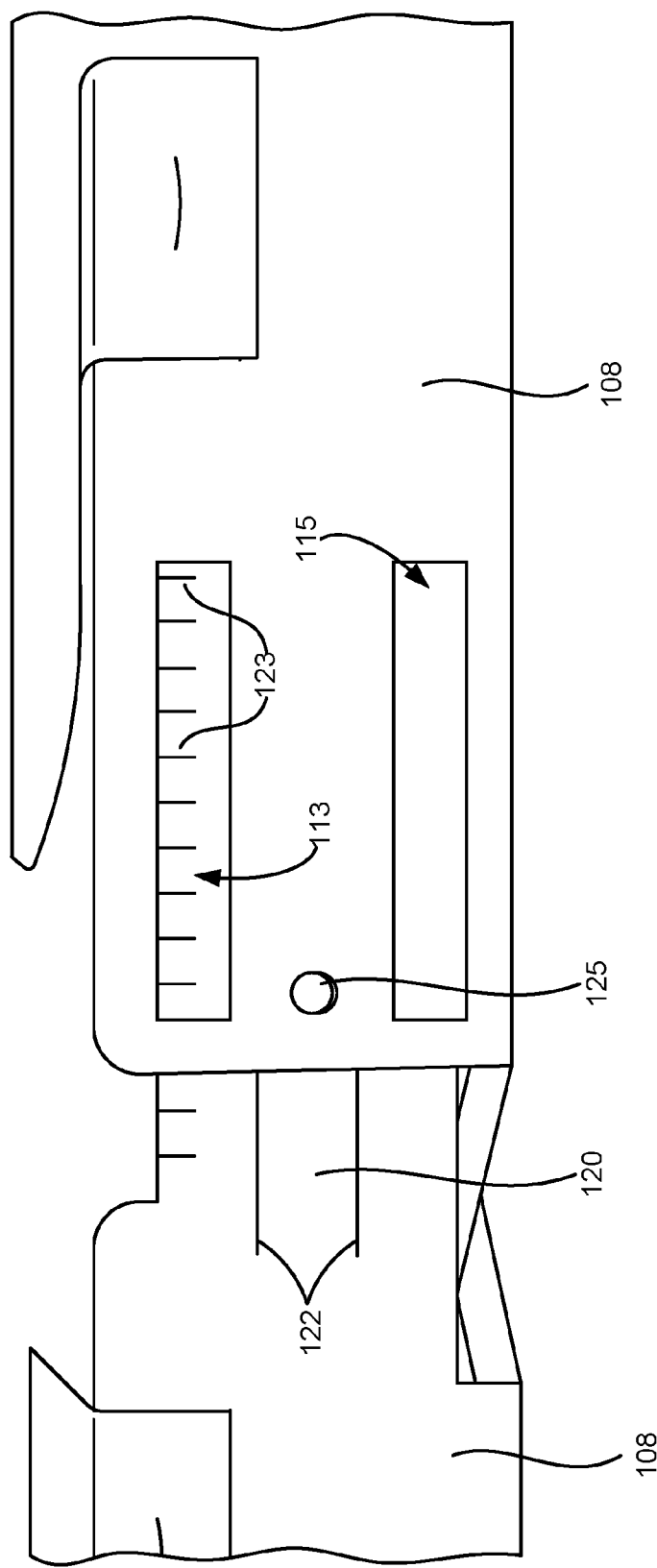
FIG. 4 is an elevational depiction of the tab having a series of cuts, making the tab bendable to lock connected segments together at a desired position.

A proximal end of the flange 108 forms an upper protuberance 112 and a lower protuberance 114. In these illustrative embodiments each protuberance 112, 114 is punched from the flange 108 and formed, producing openings 113, 115 in the flange 108. FIG. 2 is a cross sectional view better depicting how the upper protuberance 112 defines a downward-facing channel 116 that is aligned with an upward-facing channel 118 defined by the lower protuberance 114. Returning to FIG. 1, a distal end of the flange 108 forms a longitudinally-extending tab 120. When adjacent first and second segments are mechanically connected together, the first segment's tab 120 overlaps the second segment's flange 108 at its proximal end. FIG. 3 is similar to FIG. 2 but further depicts how the first segment's tab 120 is sized to slidingly engage within the opposing channels formed by the protuberances 112, 114 in the second segment's flange 108. Stiffening ribs 122 can be formed into the tab 120 to prevent it from buckling under the frictional forces resulting from the sliding engagement against the other segment. FIG. 4 is an elevational view depicting a plurality of cuts 123 through the top of the tab 120. After the adjacent segments have been moved to the desired positions, the user can easily bend the top edge of the tab 120 between the cuts 123 downward into the opening 113. That creates an interference fit between the first segment's tab 120 and the second segment's flange 108, thereby advantageously locking the connected segments together at the desired position. Alternatively, the tab 120 and flange 108 can be locked together by inserting a self-drilling fastener through an opening 125 in the flange 108 into the tab 120.

Thus, the first segment's tab 120 and the second segment's flange 108 cooperatively form an external sidewall at all of the selectively movable positions of the segments in relation to each other. Returning to FIG. 1, the flanges 110 of connected segments cooperatively form an opposing external sidewall in the same manner. An internal partition 124 divides the internal cavity into a high voltage rated wiring compartment 126 and a low voltage rated wiring compartment 128. Like the flanges 108, 110, the internal partitions 124 of connected sections overlap so that they cooperatively form an internal partition at all of the selectively movable positions of the segments in relation to each other. That is, the high voltage rated wiring compartment 126 is defined between the internal partitions 124 and the flanges 108, and the low voltage rated wiring compartment 128 is defined between the partitions 124 and the flanges 110. This construction satisfies electrical code requirements that a raceway have high voltage and low voltage wiring that are mechanically isolated from each other by being routed in separate compartments.

Figure 5:
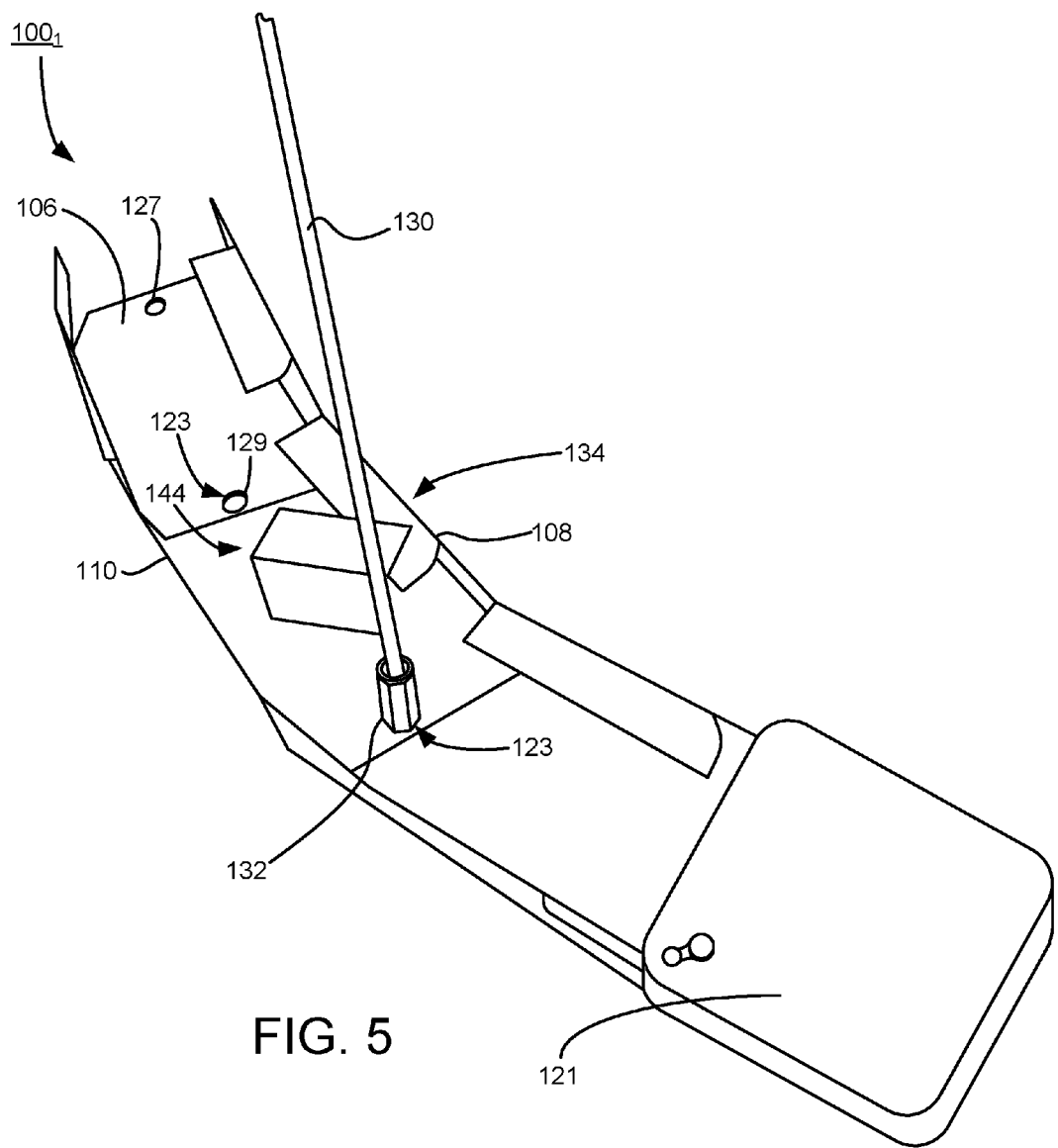
FIG. 5 is an isometric depiction of a movable raceway that is constructed in accordance with other embodiments of this technology.

FIG. 5 is an isometric depiction of a movable raceway $100_1$ constructed in accordance with alternative embodiments of this technology. Here, one end of the movable raceway $100_1$ is depicted as being connected to an electrical junction box 121, to which conduit (not depicted) is attached for routing the high voltage wiring to the movable raceway $100_1$. In these depicted embodiments the adjacent segments are joined by a pivotal connection 123 permitting the movable raceway $100_1$ to be formed into a desired shape, such as an arcuate shape of one or more desired radiuses. To form the pivotal connection 123, each segment forms an annular boss 127 at one end and an opening 129 at the other end. The first segment's boss 127 is inserted into the second segment's opening 129, and then the boss 127 is crimped to pivotally connect the two segments together.

A support rod 130 can suspend the movable raceway $100_1$ from an overhead structure (not depicted). The contemplated embodiments are not limited to these illustrative embodiments in which the support rod 130 is configured to suspend the movable raceway $100_1$ from the overhead structure. That is, in alternative embodiments the support rod can support the movable raceway from another support structure such as a wall or a floor, and the like. Further, the contemplated embodiments are not limited to these illustrative embodiments in which the support rod 130 is constructed of an all-thread rod (fully threaded rod). In alternative embodiments the support rod can be a partially threaded rod or a non-threaded rod or other support member, so long as it supports the moveable raceway $100_1$ in the desired shape.

Figure 6:
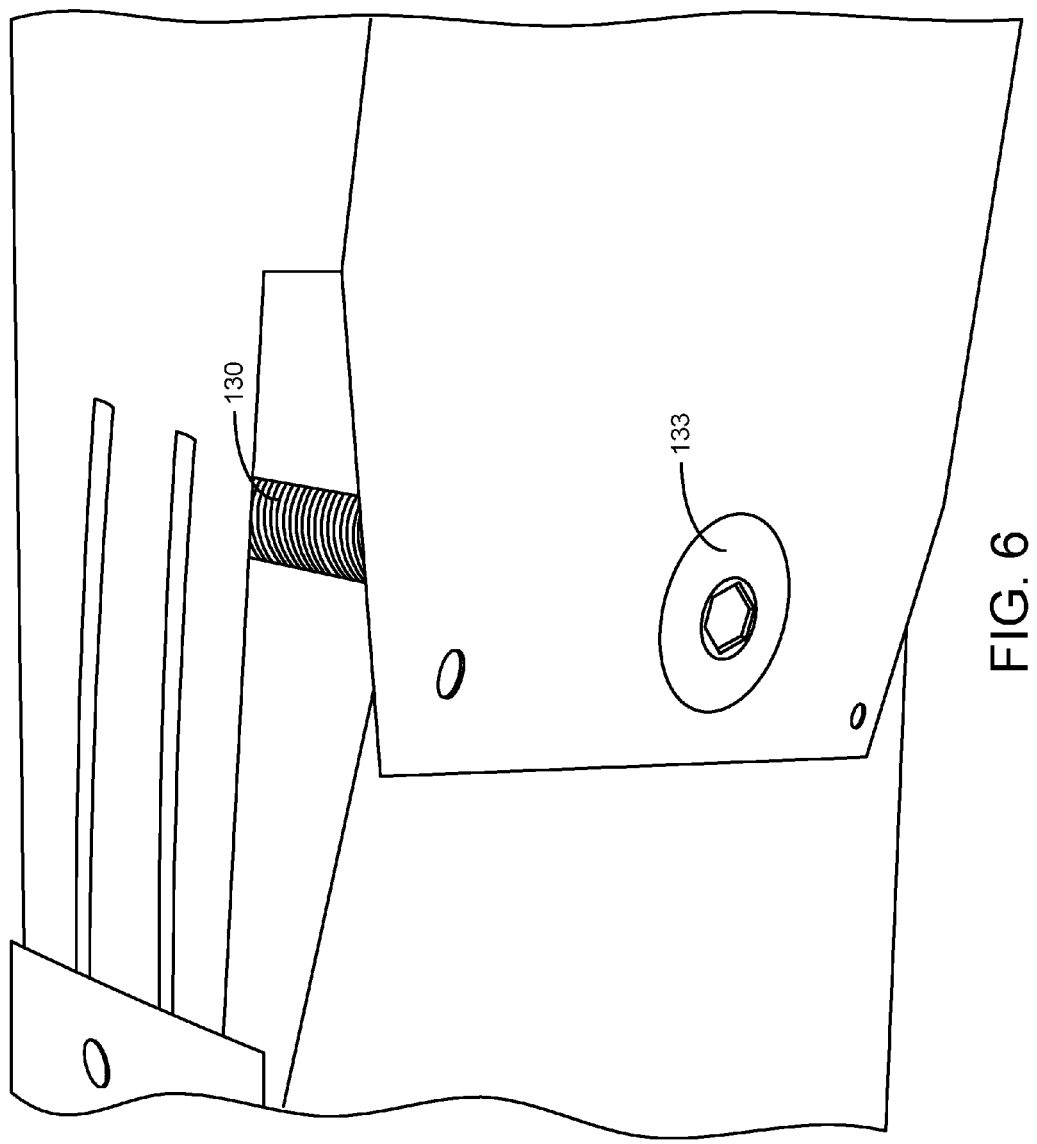
FIG. 6 is an isometric bottom depiction of the movable raceway of FIG. 5.
Figure 7:
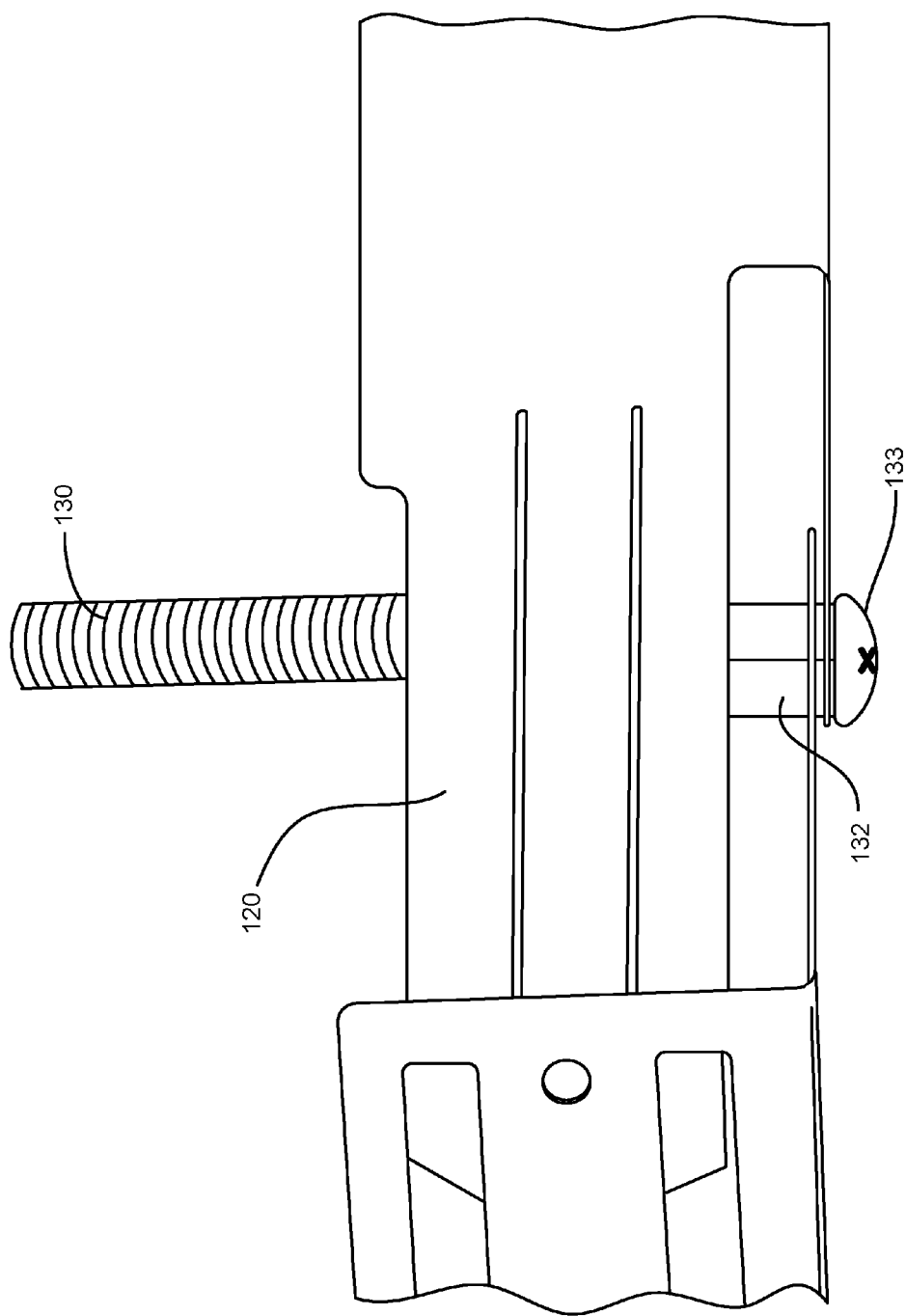
FIG. 7 is an elevational depiction of the movable raceway of FIG. 5.

In these depicted embodiments an upper end (not depicted) of the support rod 130 is attached to the overhead structure. A lower end of the support rod 130 is threadingly attached to a top end of a threaded coupler 132. FIG. 6 depicts the head of a screw 133 that has a threaded shank passing through the opening of the pivotal connection 123 and threadingly engages the bottom end of the threaded coupler 132. The head is larger than the opening in the pivotal connection 123, thereby supporting the movable raceway $100_1$ from the distal end of the support rod 130 as best depicted in FIG. 7.

Figure 8:
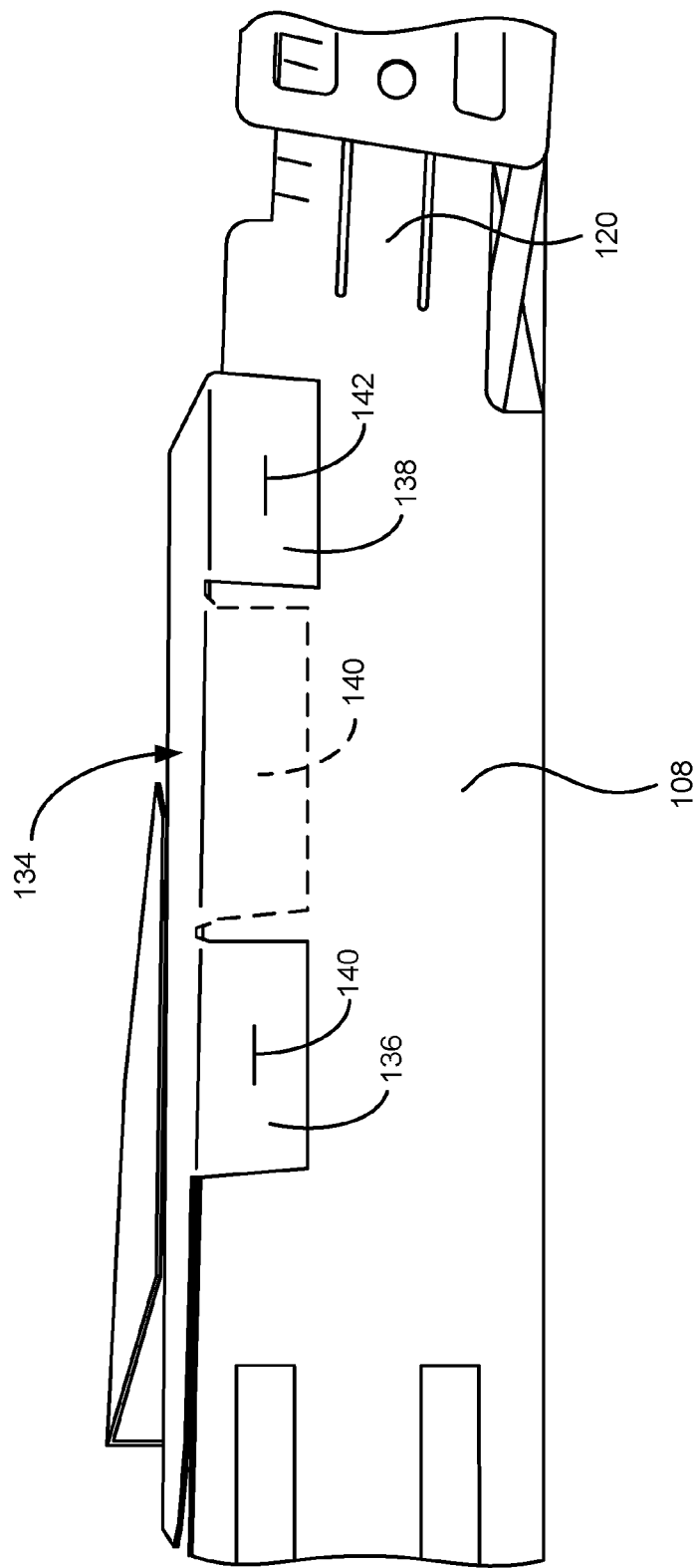
FIG. 8 is an elevational depiction of a quick connect feature of the internal partition to the upstanding flange in the movable raceway of FIG. 5.

The embodiments of FIG. 5 depict illustrative portions of the internal partition. For example, a first portion 134 of the internal partition has a quick-connect feature for attachment to the flange 108. FIG. 8 is an elevational depiction of a quick-connect feature in accordance with illustrative embodiments of this technology. The internal partition has two flanges 136, 138 that operably engage one side of the flange 108, and a third offset flange 140 that operably engages the opposing side of the flange 108. That is, the internal partition is attached by sandwiching the flange 108 between the flanges 136, 138 and the flange 140. The flange 108 has a pair of detents (FIG. 19 156, 158) that are sized and positioned to be snappingly engaged by bosses 140, 142 formed in the flanges 136, 138 and protruding toward the flange 108.

Returning to FIG. 5, a second illustrative portion 144 of the inner partition depicts supporting the receptacle 104 so that its face is angled to the flanges 108, 110. This advantageously provides the user more operating room for inserting the plug 107 in (and removing the plug 107 from) the receptacle 104. Although not depicted in FIG. 5, in addition to these illustrative portions 134, 144, the inner partition of these illustrative embodiments also has the proximal end protuberances and the mating distal end tab as described above so that the inner partition of connected segments provides a continuous partition segregating the compartments 126, 128 at all selected positions of the movable sections.

FIG. 9 depicts the internal partition $124_1$ in accordance with these illustrative embodiments of this technology. The internal partition $124_1$ has the quick connect portion 134 that sandwiches the flange 108 between the flanges 136, 138 and the flange 140. The internal partition $124_1$ also has the second portion 144 in the form of an angled support surface 145 to which the receptacle 104 is attached. The receptacle 104 is a commercially available component, and the support surface 145 is sized to accommodate the way that a selected receptacle is intended to be attached. For example, the support surface 145 can be sized to accommodate spot welding or snapping the receptacle 104 in place, and the like.

It can be advantageous to provide the receptacle 104 with special surfaces or special surface treatment to facilitate insertion of the electrical plug 107.

A flange $108_1$ extends substantially parallel to the flanges 108, 110, and has opposing protuberances $112_1$, $114_1$ in the manner described above. A distal tab $120_1$ is sized to slidingly engage within the protuberances $112_1$, $114_1$ of the segment to which it is attached in the manner described above. A number of transition surfaces connect the support surface 145 to the flange $108_1$ and the tab $120_1$.

Thus, in the same way described above, the flange $108_1$ of one segment and the tab $120_1$ of another connected segment overlap in sliding engagement with each other to provide a continuous partition for all selected positions of the connected segments. This provides structural integrity of the high voltage rated wiring compartment 126 and the low voltage rated wiring compartment 128 throughout the selectable movements of the connected segments. FIG. 10 is an elevational depiction of the inner partition $124_1$ disconnected from the flange 108, and thereby more particularly depicting both of the opposing protuberances $112_1$, $114_1$ at the proximal end.

FIG. 11 is a top depiction similar to the isometric depiction of FIG. 5 but additionally having a cap 146 attached to enclose the internal compartments 126, 128. The cap 146 is notched to provide clearance for attachment of the support rod 130 for attachment and removal of the cap 146 while the support rod 130 is installed. Surface features are provided in the cap 146 to facilitate the routing and securement of the electrical wiring. For example, a number of protruding loops 148 can be provided for tying wire or wire bundles in place. Further, a number of removable knockouts 150 can be provided to create additional openings for wire routing and/or for alternatively supporting the support rod 130. FIGS. 12 and 13 are additional top and side depictions of the cap 146 with these surface features 148, 150.

Figure 14:
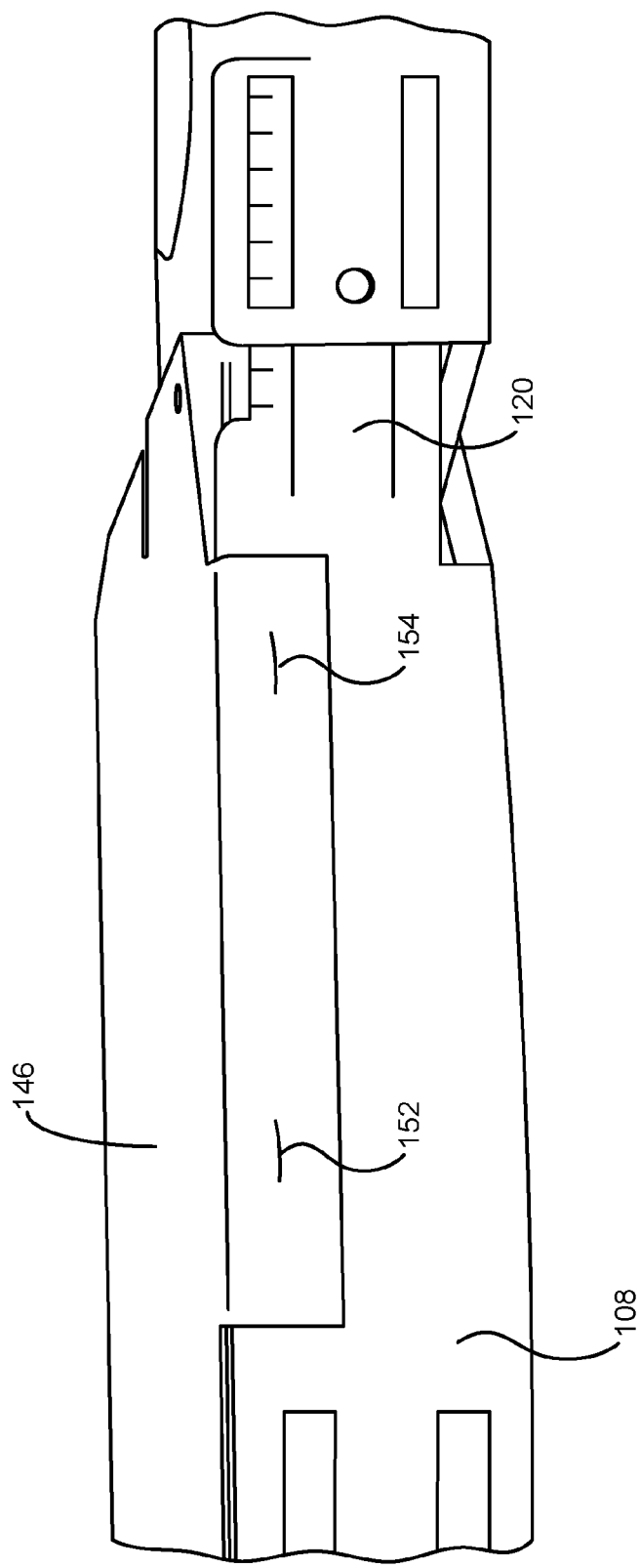
FIG. 14 is an elevational depiction of a quick connect feature of the cap of FIG. 11.

Preferably, the top cap 146 also has quick connect features like that described above. For example, FIG. 14 depicts the top cap 146 having a pair of bosses 152, 154 that are sized, positioned, and protrude inwardly to snappingly engage into the detents forming the bosses 140, 142 (FIG. 8) in the flanges 136, 138 of inner partition $124_1$. The opposing side of the cap 146 similarly has bosses that snappingly engage into detents formed in the opposing flange 110 (not depicted).

Figure 15:
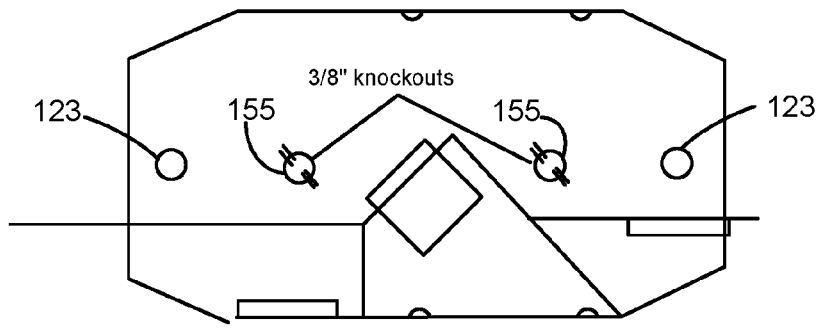
FIG. 15 is similar to FIG. 9 but further depicting knockouts in the segment assembly of the movable raceway in FIG. 5.

FIG. 15 is a top depiction of a segment used in the movable raceway $100_1$ described above and additionally having a number of removable knockouts 155 for use in routing wiring and/or suspending fixtures. For example, the embodiments of FIG. 1 depict how a light fixture can be suspended from the movable raceway 100 by a drop rod that is connected to the segment via an opening provided by the pivotal connection 123 or by one of the knockouts 155.

Figure 16:
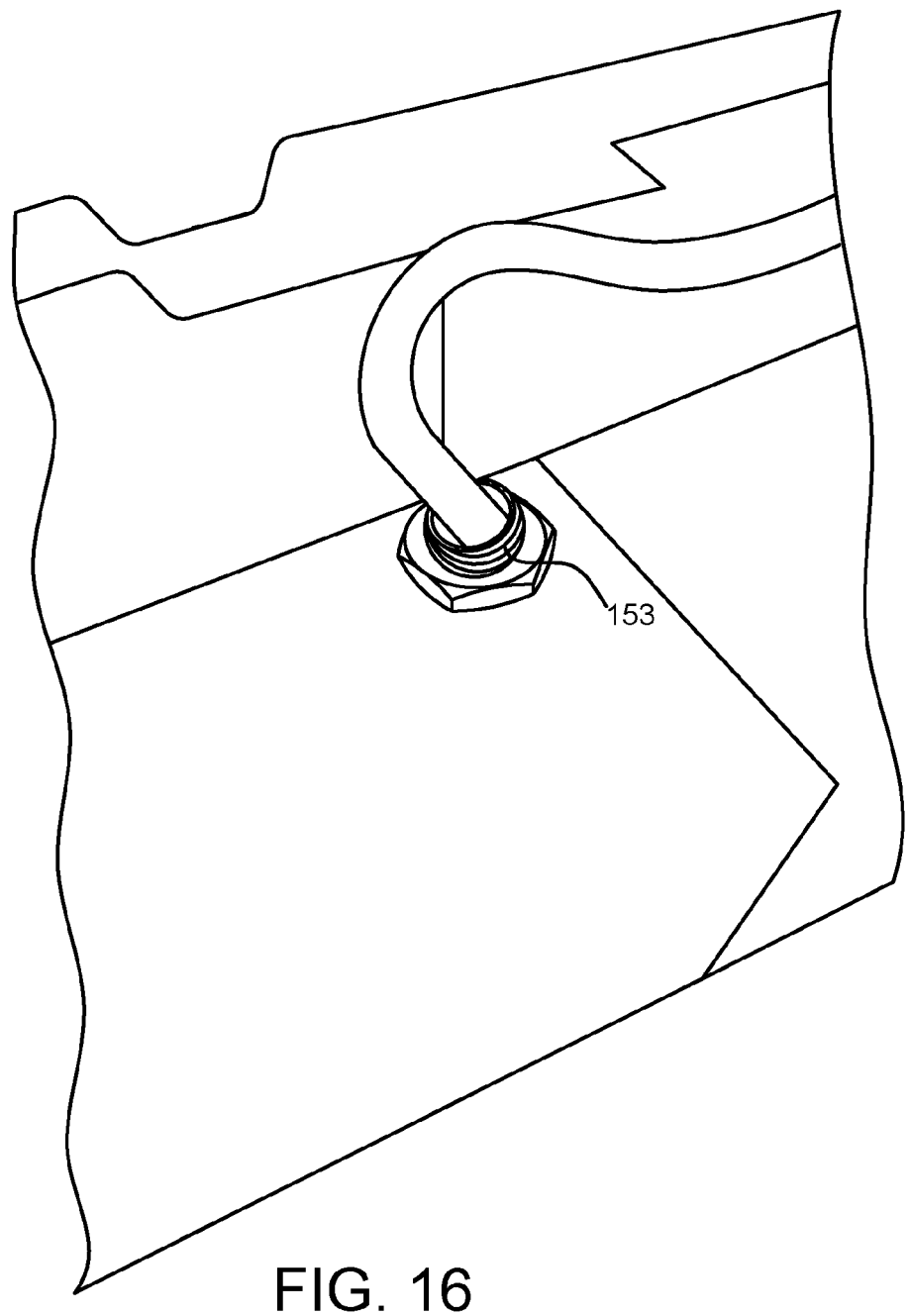
FIG. 16 depicts a nipple attaching a fixture bracket to the movable raceway.
Figure 17:
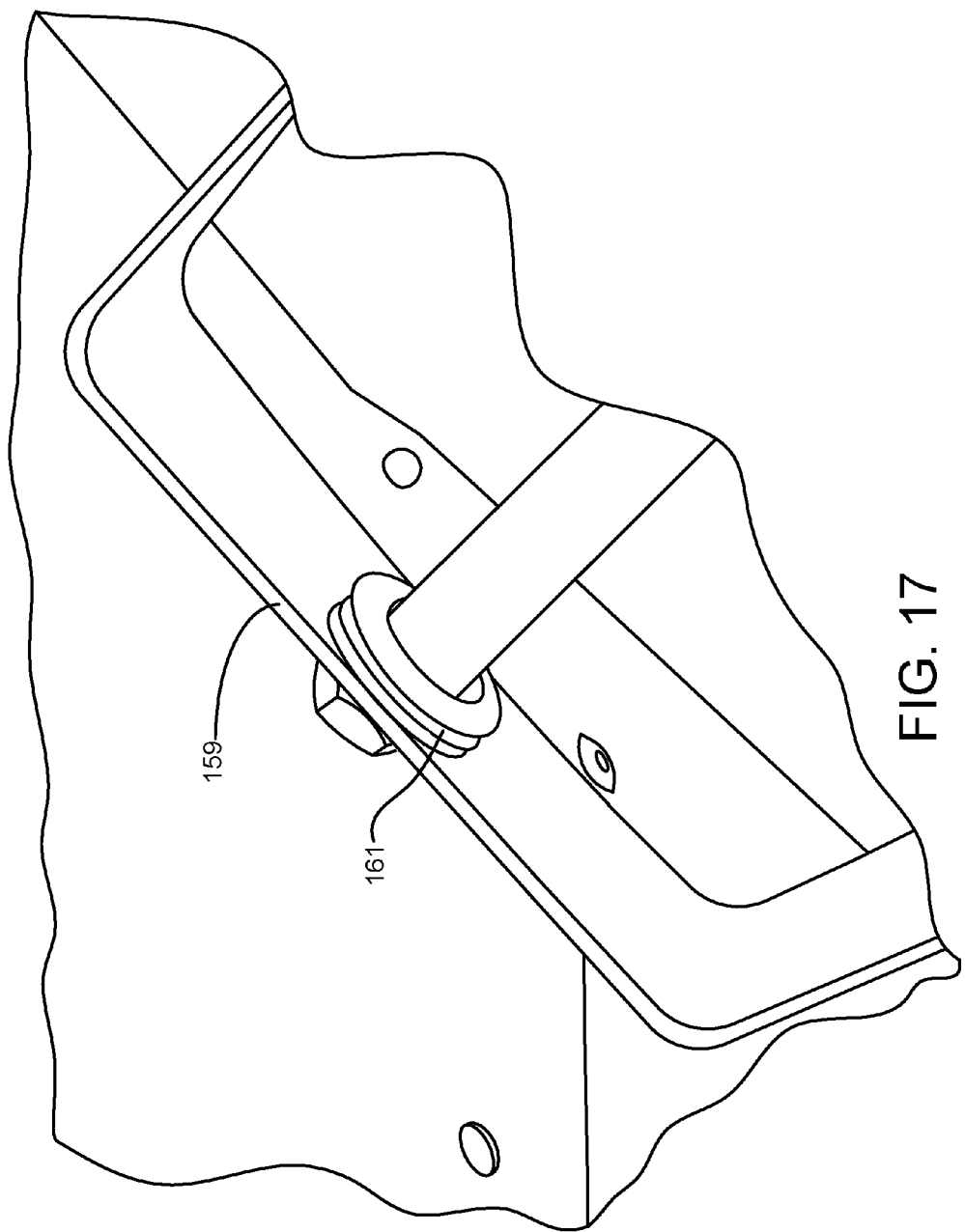
FIG. 17 depicts the fixture bracket attached to the movable raceway.
Figure 18:
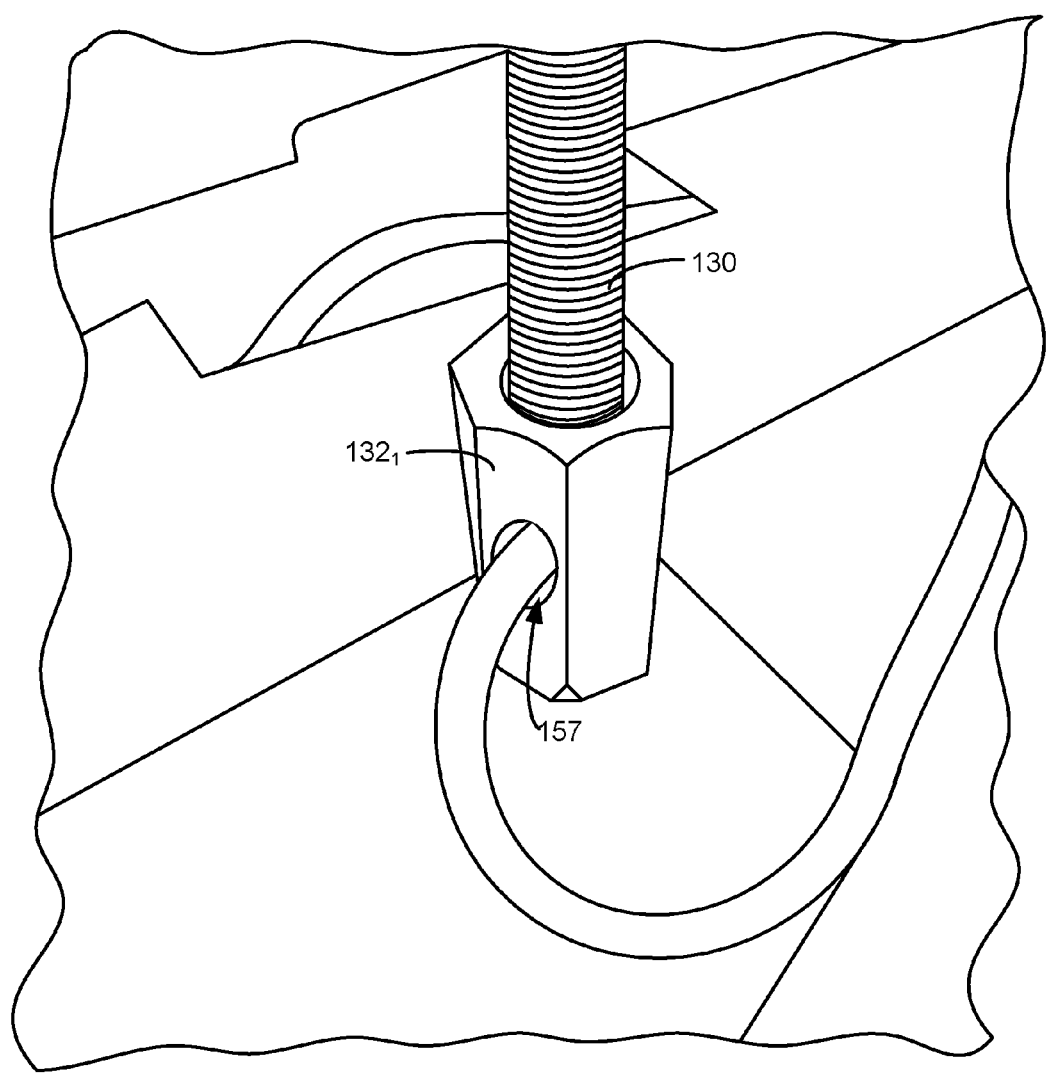
FIG. 18 depicts a threaded coupler with a lateral opening intersecting the bore so that the support rod and the fixture can both be connected to the same opening in the movable raceway.

FIG. 16 depicts using a threaded nipple 153 in the pivotal connection 123 instead of the support rod. The nipple 153 can likewise be inserted into an opening provided by the knockouts 155. FIG. 17 is a bottom view of the movable raceway 100 depicting a bracket 159 secured to the nipple 153 by a threaded fastener 161. FIG. 18 depicts a threaded coupler $132_1$ similar to the one depicted in FIG. 5 but further having an opening 157 intersecting the longitudinal opening. The threaded coupler $132_1$ permits using the same opening (pivot connection 123 or knockout 155) for connecting both the support rod 130 and a fixture. The electrical wiring from the fixture can be routed into the movable raceway via the opening 157 in the threaded collar $132_1$.

Figure 19:
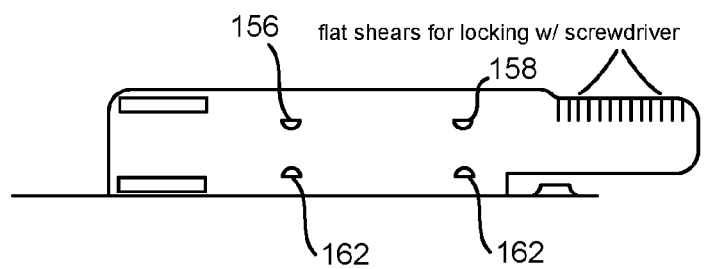
FIG. 19 is an elevational depiction of a segment of the movable raceway of FIG. 5.
Figure 20:
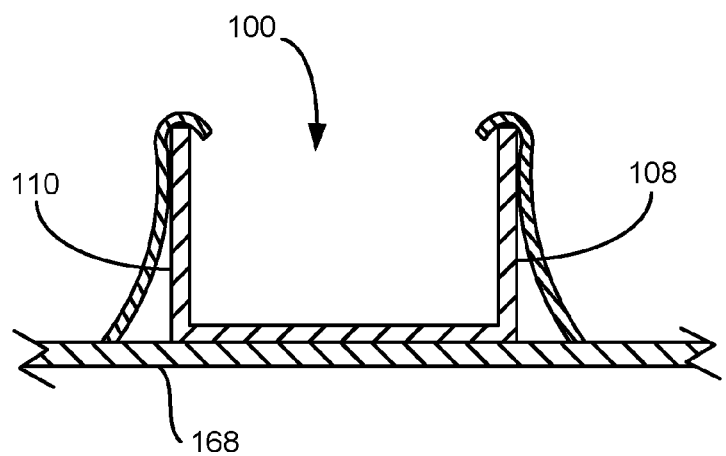
FIG. 20 is a cross sectional depiction of a concealment member connected to the movable raceway of FIG. 5.

FIG. 19 is an elevational depiction of a segment of the movable raceway $100_1$ described above with the inner partition $124_1$ removed. Detents 156, 158 are formed in the flange $108_1$ that are sized and positioned to be snappingly engaged by the bosses 140, 142 (FIG. 8) in the inner partition $124_1$ in order to attach the inner partition $124_1$ to the flange $108_1$. Another pair of detents 160, 162 are formed in the flange $108_1$ for snappingly attaching a concealment member (not depicted) to decoratively block sight of the movable raceway $100_1$. The concealment member can be fashioned of any aesthetic design that matches the décor, such as for example decorative palm leaves and the like that form part of the décor. FIG. 20 depicts an alternative manner of snapping attachment arms of the concealment member 168 over the top edges of the external sidewalls 108, 110. The cap is sized to either snap over or otherwise clear the attachment arms to enclose the compartments as described herein.

Figure 21:
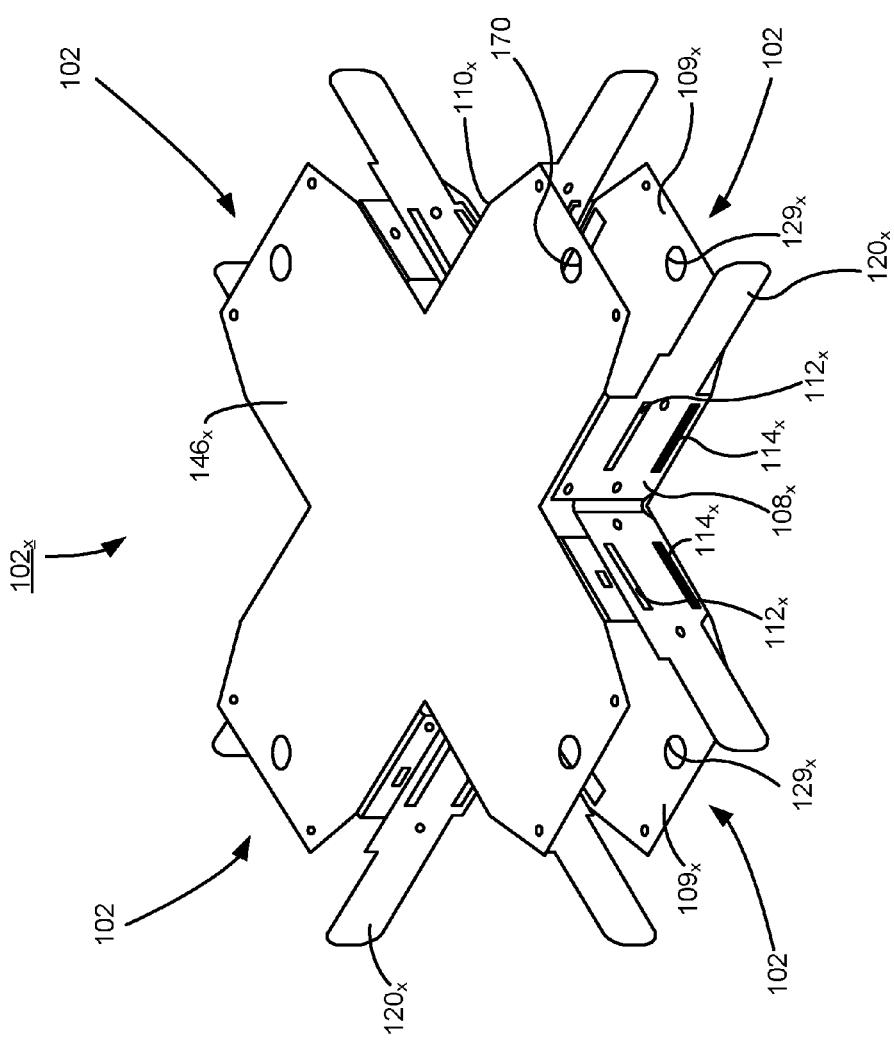
FIG. 21 is an isometric depiction of an X-shaped segment assembly.

FIG. 21 depicts an X-shaped segment assembly $102_X$ that can be used to interconnect up to four of the segment assemblies 102. Adjacent interconnected segment assemblies 102 are orthogonal and coplanar with each other. Similar to that described above, the segment assembly $102_X$ has an X-shaped planar base $109_X$ with opposing upstanding flanges $108_X$, $110_X$. Openings $129_X$ are formed for receiving the boss 127 of a segment assembly 102 (not depicted) for pivotally connecting them together as described above. Each of the flanges $108_X$, $110_X$ defines both opposing protuberances $112_X$, $114_X$ and a tab $120_X$. That enables connecting to a segment assembly 102 in either of its two possibly presented orientations. That is, the tab 120 of a segment assembly 102 (not depicted) can be connected to the opposing protuberances $112_X$, $114_X$ of the segment assembly $102_X$. Conversely, the opposing protuberances 112, 114 of a segments assembly 102 (not depicted) can be connected to the tab $120_X$ of the segment assembly $102_X$. Similar to the description above, an internal partition $124_X$ (not depicted) can attach to one of the upstanding flanges $108_X$, $110_X$ by matching detents to divide the segment assembly $102_X$ into a high voltage compartment $126_X$ and a low voltage compartment $128_X$. A cap $146_X$ encloses the partitioned compartments such as via matching detents as described above. Openings 170 are provided for the support rod 130 (FIG. 11) to pass through the cap $146_X$. Although not depicted in FIG. 21, the cap $146_X$ can be provided with other useful features as described above, such as but not limited to loops 148 and knockouts 150.

Figure 22:
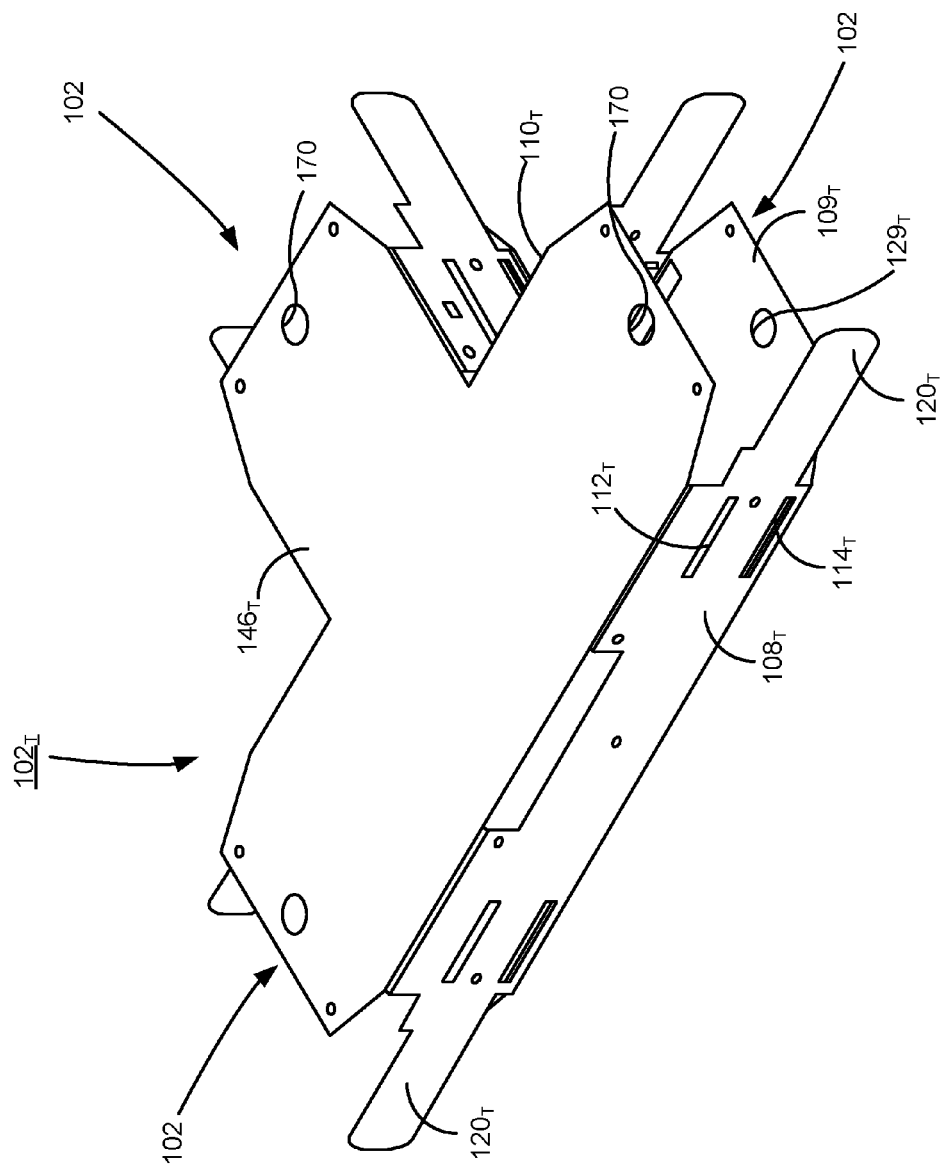
FIG. 22 is an isometric depiction of a T-shaped segment assembly.

FIG. 22 is similar to FIG. 21 but depicts a T-shaped segment assembly $102_T$ that can be used to interconnect up to three of the segment assemblies 102. Again, adjacent interconnected segment assemblies 102 are orthogonal and coplanar with each other. The segment assembly $102_T$ has a T-shaped planar base $109_T$ with opposing upstanding flanges $108_T$, $110_T$. Openings $129_T$ are formed for receiving the boss 127 of a segment assembly 102 (not depicted) for pivotally connecting them together as described above. Each of the flanges $108_T$, $110_T$ defines both opposing protuberances $112_T$, $114_T$ and a tab $120_T$. That enables connecting to a segment assembly 102 in either of its two possibly presented orientations. That is, the tab 120 of a segment assembly 102 (not depicted) can be connected to the opposing protuberances $112_T$, $114_T$ of the segment assembly $102_T$. Conversely, the opposing protuberances 112, 114 of a segment assembly 102 (not depicted) can be connected to the tab $120_T$ of the segment assembly $102_T$. Similar to the description above, an internal partition $124_T$ (not depicted) can attach to one of the upstanding flanges $108_T$, $110_T$ by matching detents to divide the segment assembly $102_T$ into a high voltage compartment $126_T$ and a low voltage compartment $128_T$. A cap $146_T$ encloses the partitioned compartments such as via matching detents as described above. Openings 170 are provided for the support rod 130 (FIG. 11) to pass through the cap $146_T$. Although not depicted in FIG. 22, the cap $146_T$ can be provided with other useful features as described above, such as but not limited to loops 148 and knockouts 150.

Figure 23:
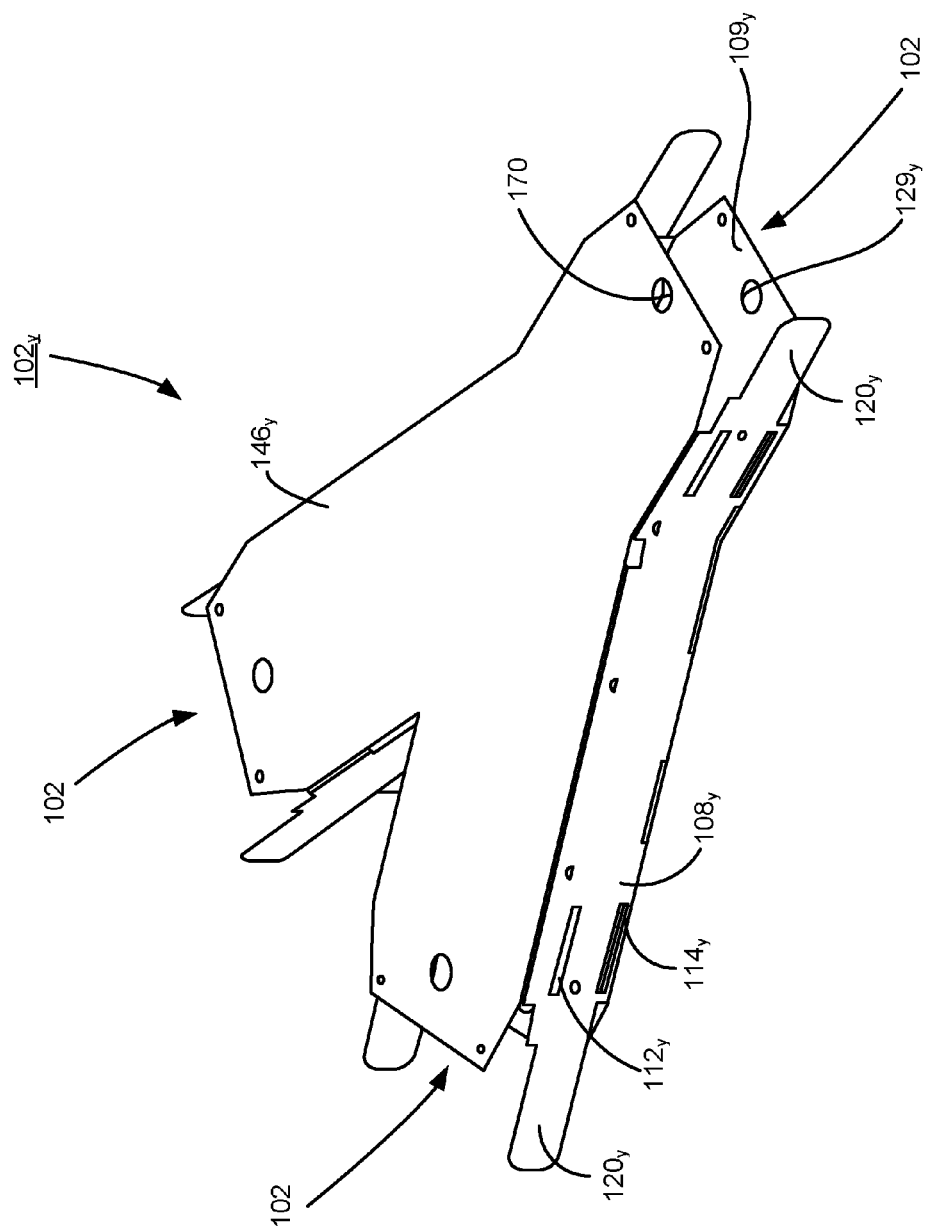
FIG. 23 is an isometric depiction of a Y-shaped segment assembly.

FIG. 23 is similar to FIG. 21 but depicts a Y-shaped segment assembly $102_Y$ that can be used to interconnect up to three of the segment assemblies 102. Here, adjacent interconnected segment assemblies 102 are coplanar to each other. The segment assembly $102_Y$ has a Y-shaped planar base $109_Y$ with opposing upstanding flanges $108_Y$, $110_Y$. Openings $129_Y$ are formed for receiving the boss 127 of a segment assembly 102 (not depicted) for pivotally connecting them together as described above. Each of the flanges $108_Y$, $110_Y$ defines both opposing protuberances $112_Y$, $114_Y$ and a tab $120_Y$. That enables connecting to a segment assembly 102 in either of its two possibly presented orientations. That is, the tab 120 of a segment assembly 102 (not depicted) can be connected to the opposing protuberances $112_Y$, $114_Y$ of the segment assembly $102_Y$. Conversely, the opposing protuberances 112, 114 of a segment assembly 102 (not depicted) can be connected to the tab $120_Y$ of the segment assembly $102_Y$. Similar to the description above, an internal partition $124_Y$ (not depicted) can attach to one of the upstanding flanges $108_Y$, $110_Y$ by matching detents to divide the segment assembly $102_Y$ into a high voltage compartment $126_Y$ and a low voltage compartment $128_Y$. A cap $146_Y$ encloses the partitioned compartments such as via matching detents as described above. Openings 170 are provided for the support rod 130 (FIG. 11) to pass through the cap $146_Y$. Although not depicted in FIG. 22, the cap $146_Y$ can be provided with other useful features as described above, such as but not limited to loops 148 and knockouts 150.

Figure 24:
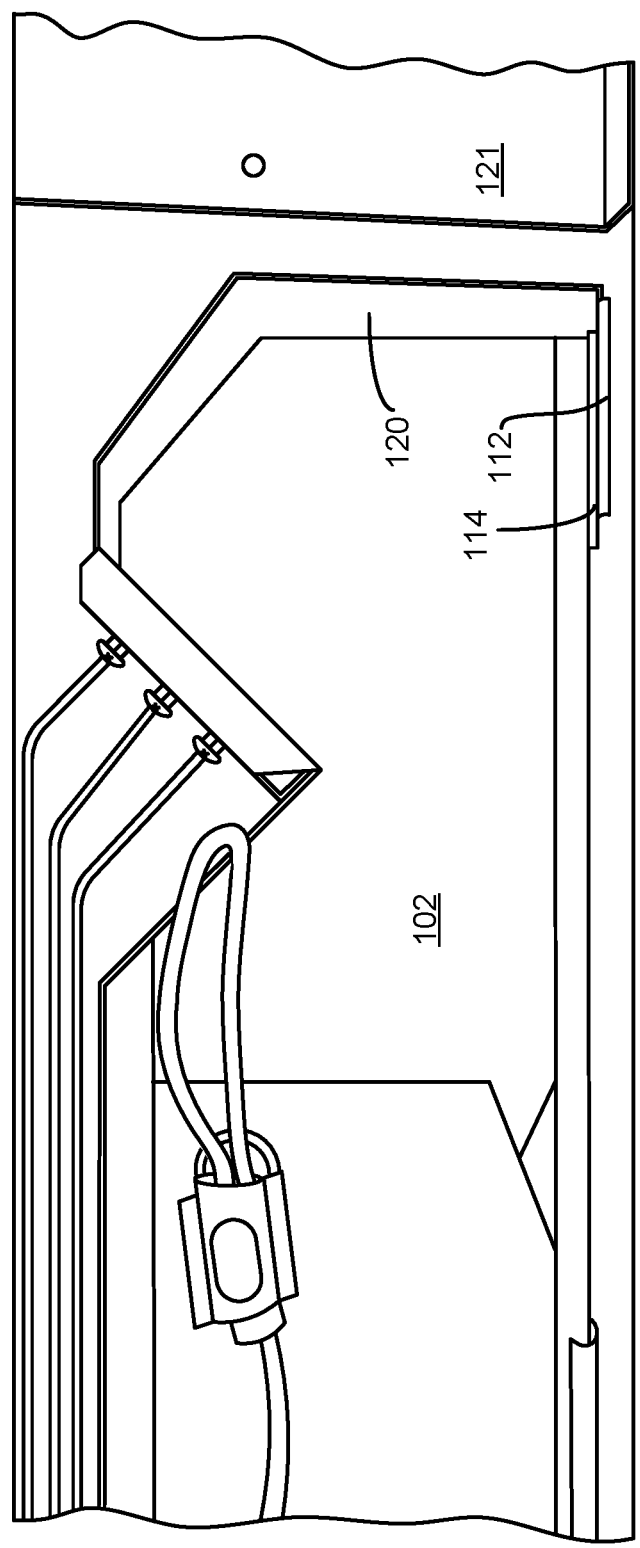
FIG. 24 is an enlarged top view of the end segment assembly.

FIG. 24 is a top depiction of an end segment assembly 102 to which the electrical junction box 121 is connected. The tab 120 has been deformed to press against the protuberances 112, 114, and thereby close the low voltage compartment 126 at the distal end of the segment assembly 102. Alternatively, an end cap (not depicted) can be constructed to attach to the segment assembly 102 to close the distal end.

Figure 25:
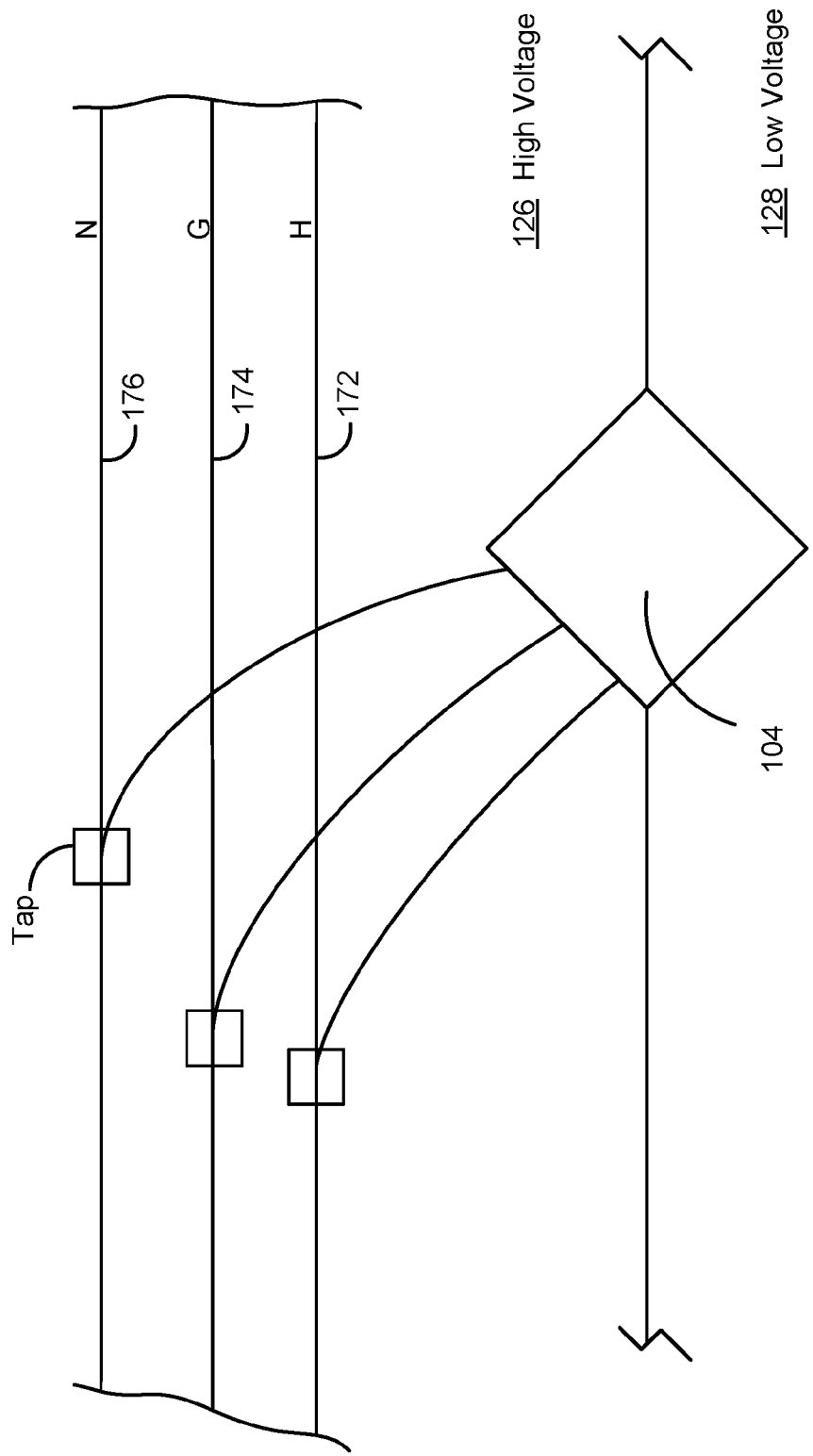
FIG. 25 is a schematic depiction of wiring an electrical receptacle into a circuit.

FIG. 25 schematically depicts one of the receptacles 104 that is energized for service. The receptacle has pigtails 171 (hot), 173 (ground), and 175 (neutral) that are electrically connected to the high voltage power lines 172 (hot), 174 (ground), and 176 (neutral). Preferably these electrical connections can be made without terminating the high voltage power lines 172, 174, 176 such as with the use of tap connectors marketed by the 3M Company under the brand name Scotchlok self-stripping electrical tap connectors. The high voltage power lines 172, 174, 176 can thus extend continuously throughout the segment assembly 102, defining a circuit. All electrical receptacles 104 that are tapped into the circuit will operate simultaneously. For example, a number of receptacles 104 can be tapped into a first circuit, so that energizing the first circuit in turn energizes those receptacles 104. Two or more circuits can be provided, each with its own set of hot, ground, and neutral wires into which the designated receptacles 104 are tapped into the respective circuit.

Figure 26:
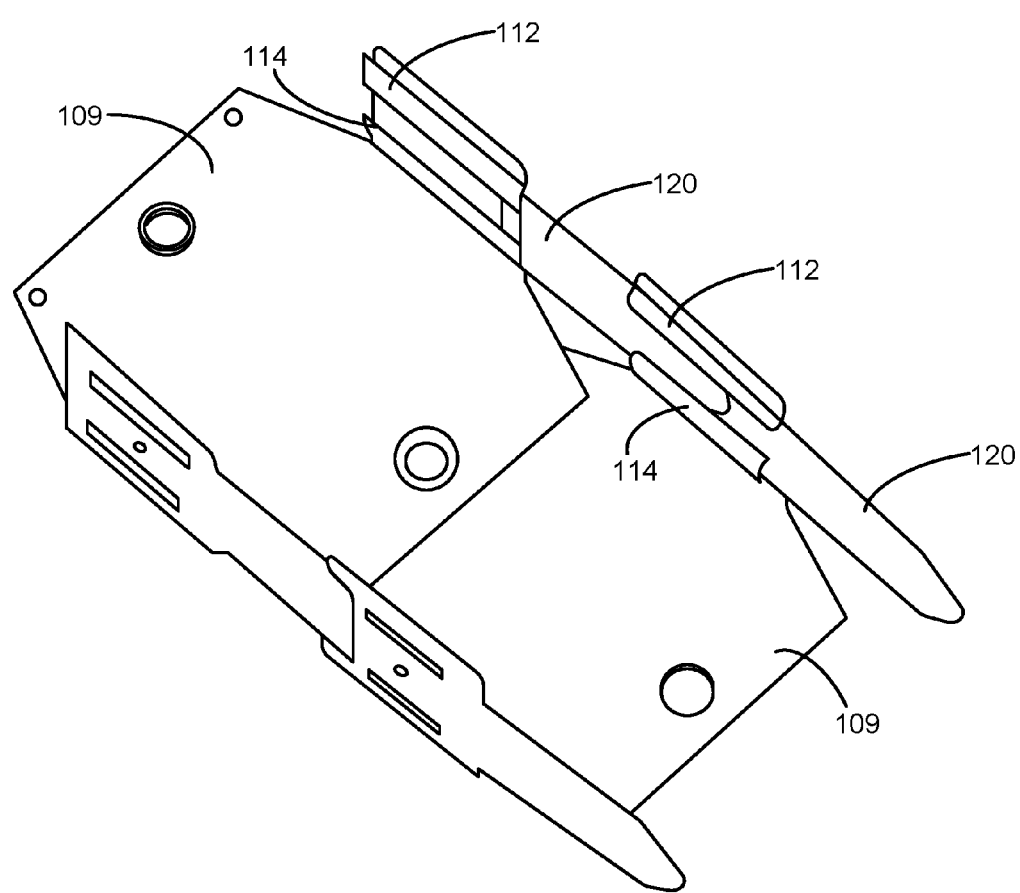
FIG. 26 is an isometric depiction of a curved wall structure using the locking mechanism technology herein.

FIG. 26 depicts the locking mechanism of this technology employed in a curved wall structure similar to that covered by U.S. Pat. No. 8,453,403 which is assigned to the assignee of this application. Each segment assembly 102 contains the opposing protuberances 112, 114 for receivingly engaging the tab 120 of the adjacent segment assembly 102, and each segment assembly 102 also contains the tab 120 for engaging the opposing protuberances 112, 114 of the adjacent segment assembly 102. When the desired positions of the adjacent segment assemblies is achieved, the tabs depicted in FIG. 4 are deformed to lock the segments assemblies in place.

The compartments described herein for high voltage and low voltage wiring is not so limited, in that alternative embodiments can route other items in the compartments such as cables, tubing, optical fibers, and the like.

In other alternative embodiments an opening can be provided for inserting a hook or eyelet, such as what is manufactured by Gripple and advertised at www.gripple.com. Any of a number of Gripple components can be inserted into each hole, such as a CT Hook or an Eyelet and the like to suspend the segment assembly 102 instead of the support rod 130 depicted in FIG. 5. In either event, the segment assembly 102 can alternatively be suspended with the cap 146 facing toward the ground rather than upward as described in the illustrative embodiments.

The various features and alternative details of construction of the apparatuses described herein for the practice of the present invention will readily occur to the skilled artisan in view of the foregoing discussion, and it is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed:

1. A raceway comprising:
a first segment having opposing first sidewalls and a first partition between the first sidewalls, each of the first sidewalls and the first partition having a laterally-extending protuberance defining a respective cavity;
a second segment having opposing second sidewalls each defining a longitudinally-extending tab (sidewall tabs) slidingly retained by the first segment's respective sidewall protuberance and a second partition between the second sidewalls defining a longitudinally-extending tab (partition tab) slidingly retained by the first segment's partition protuberance, the second segment operably connected to the first segment so that the segments are selectively movable in relation to each other, wherein the first segment's sidewalls overlap the respective second segment's sidewall tabs and the first segment's partition overlaps the second segment's partition tab to define separate longitudinally-extending compartments in the raceway at all selected movable positions of the segments with respect to each other.

* * * * *